3,783,066
REINFORCED STRUCTURAL MEMBER OF FIBER
GLASS AND METHOD OF MAKING THE SAME
Robert E. Myers, 18506 Prince William Lane,
Houston, Tex. 77058
Filed Sept. 29, 1971, Ser. No. 184,802
Int. Cl. B32b 1/00
U.S. Cl. 156—161                                 2 Claims

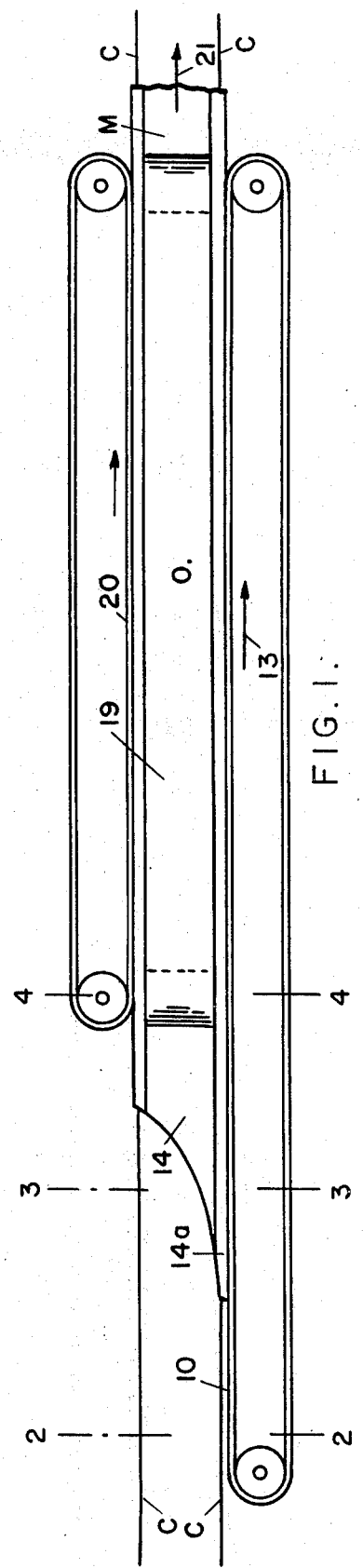
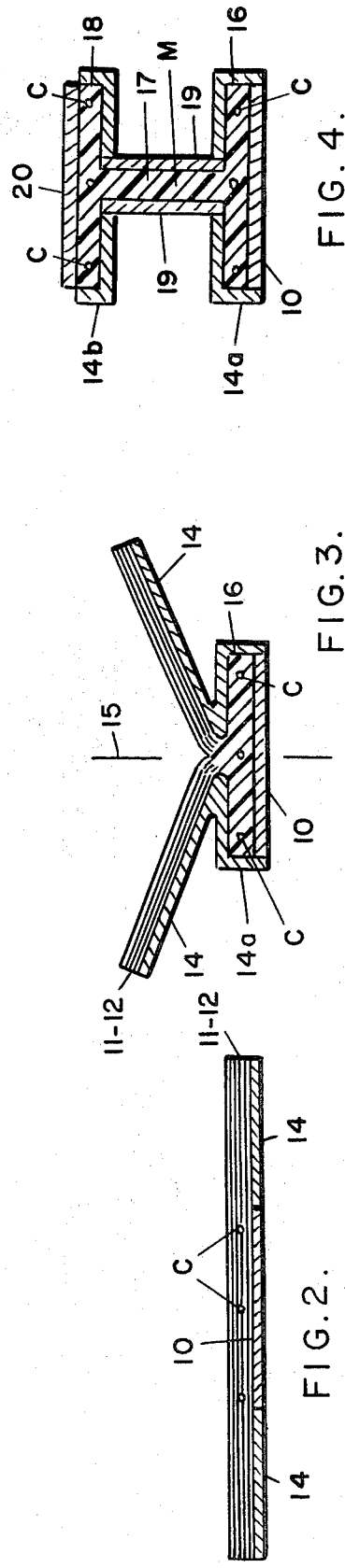
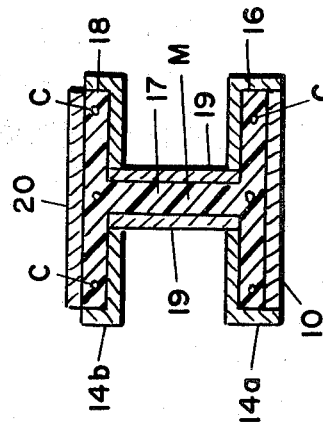

ABSTRACT OF THE DISCLOSURE

Multiple layers of fiber glass cloth wetted with plastic resin are moved by a conveyor belt along shaping planes so that the cloth layers are shaped into a desired cross-section of the structural member being formed. Simultaneously, pre-tensioned reinforcing cords are passed longitudinally above the conveyor belt so that they become embedded between the cloth layers and are bonded within the structural member when the resin is cured.

---

This invention relates to new and useful improvements in elongated structural members made of fiber glass, such as beams, angles, channels, tubes, et cetera, and the principal object of the invention is to substantially increase the strength and load carrying capacity of such structural members by providing the same with longitudinally extending pre-tensioned reinforcing cords.

Another object of the invention is to provide improved structural members of the aforementioned type which are laminated, consisting of multiple layers of fiber glass cloth shaped to a desired cross-section, with the pre-tensioned reinforcing cords embedded between the cloth layers.

Still another object of the invention is to provide a method by which shaping of the fiber glass cloth layers into a structural member and embedding of the reinforcing cords therein may be easily and economically effected in a continuous manner.

With the foregoing more important objects and features in view and such other objects and features which may become apparent as this specification proceeds, the invention will be understood from the following description taken in conjunction with the accompanying drawings, wherein like characters of reference designate like parts and wherein:

FIG. 1 is a diagrammatic side elevational view of apparatus such as may be used in practicing the method of the invention in continuously making a reinforced structural member of fiber glass;

FIG. 2 is a cross-sectional view taken substantially in the plane of the line 2—2 in FIG. 1 and showing the multiple layers of fiber glass cloth;

FIG. 3 is a cross-sectional view taken substantially in the plane of the line 3—3 in FIG. 1 and showing the cloth layers as being shaped into a structural member;

FIG. 4 is a cross-sectional view taken substantially in the plane of the line 4—4 in FIG. 1 and showing the formed structural member with the reinforcing cords embedded therein; and FIG. 5 is an enlarged fragmentary sectional view of the multiple fiber glass layers and protective sheet.

Referring now to the accompanying drawings in detail, FIG. 4 shows the cross-section of a typical elongated structural member M which may be continuously formed by the method of the invention, the member M being made of fiber glass and having a set of longitudinally extending reinforcing cords C embedded therein. For purposes of illustration, the member M in FIG. 4 is shown as having the cross-section of an I-beam, although it is to be understood that other cross-sectional shapes such as angles, channels, tubes, and the like may also be made in accordance with the same method.

The first step of the method involves placing on a moving conveyor belt 10 alternate multiple layers for fiber glass cloth 11, 12, such as woven roving and chopped strand. This is done at the work station indicated generally by the plane 2—2 in FIG. 1, the direction of movement of the conveyor belt being indicated by the arrow 13. The cloth layers 11, 12 are thoroughly wetted out with plastic resin, and the number of cloth layers is such as to eventually form a structural member of a desired wall thickness. Similarly, the width of the cloth layers is predetermined to form a structural member of a desired cross-section, as will be hereinafter apparent.

As shown in FIG. 2, at the work station 2—2 the conveyor belt 10 is flanked along both sides by flat shaping plates 14 so that the combined width of the belt and plates corresponds substantially to the width of the cloth layers 11, 12.

As the cloth layers are conveyed by the belt 10 to the work station indicated generally by the plane 3—3 in FIG. 1 and also shown in FIG. 3, the shaping plates 14 gradually take the form indicated at 14a which causes the center portion of the cloth layers to be doubled upon itself towards the longitudinal center line 15 and results in forming the bottom flanges 16 of the I-beam M. In the meantime, the side portions of the cloth layers ride along the shaping plates 14 which by this time are slanted upwardly, and by the time the cloth layers reach the work station represented generally by the plane 4—4 in FIG. 1 and also shown in FIG. 4, the shaping plates will have gradually formed the cloth layers into the central web 17 and top flanges 18 of the I-beam.

At the work station 4—4 the shaping plates are discontinued at the opposite sides of the I-beam web 17 which is then guided by a pair of conveyor belts 19 operating in vertical planes, while the top of the I-beam is guided by an additional conveyor belt 20, as will be apparent from FIG. 4. The top surfaces and side edges of the lower flanges 16 continue to be guided by the shaping plate portions 14a, and similarly, the bottom surfaces and side edges of the top flanges 18 continue to be guided by the shaping plate portions 14b.

Simultaneously with all of the foregoing, pre-tensioned reinforcing cords C are made to pass longitudinally above the conveyor belt 10 so that they become embedded between the cloth layers 11, 12 during formation of the structural member M. These cords are tensioned in any suitable manner while they move at the same speed as the belts 10, 19, 20, and they are located so that they become embedded in the structural member at selected positions. As for example with the I-beam, three such cords may be embedded in the bottom flanges 16 and three in the top flanges 18 and, if desired, an additional cord may be embedded at the center of the web 17.

After passing the work station 4—4, the fully formed structural member M with the cords C embedded therein is conveyed by the belts 10, 19, 20 through an oven indicated generally as O in FIG. 1, where the plastic resin in the cloth layers is cured by heat and the pre-tensional cords are firmly bonded within the cloth layer structure of the finished product which is discharged from the oven as indicated at 21 in FIG. 1.

It will be apparent from the foregoing that in this manner the reinforced structural member M is fabricated in a continuous operation, including shaping of the multiple cloth layers into a member of the desired cross-section, embedding the pre-tensioned cords at selected points in the cross-section of the member, curing, and eventually discharging the finished product in running length.

It will be also noted that because of the multiple cloth layers, the structural member is laminated and thereby possesses considerable strength as such, in addition to the strength provided by the pre-tensioned cords which are embedded therein.

The reinforcing cords C may consist of fiber glass, or some other suitable material such as stainless steel wire may be used.

In order to prevent the fiber glass cloth layers 11, 12 from sticking to the conveyor belts and to the shaping plates, it is desirable to provide a protective sheet of thin plastic 22 under the cloth layers, as shown in FIG. 5, before the cloth layers are placed on the belt 10 at the work station 2—2. As the cloth layers are shaped into the form of the structural member M, the plastic sheet covers the outer surfaces of the flanges and web of the structural member and is then readily peeled off the finished product.

While in the foregoing there has been shown and described the preferred embodiment of the invention, various modifications and equivalents may be resorted to within the spirit and scope of the invention as claimed.

What is claimed as new is:

1. A method of continuously making an elongated structural member of fiber glass reinforced by pre-tensioned longitudinal cords, said method comprising the steps of:
   (a) placing multiple layers of fiber glass cloth wetted with plastic resin on a moving horizontal conveyor belt;
   (b) passing said cloth layers along fixed shaping surfaces such that the layers are shaped into a desired cross-section of the structural member being formed;
   (c) maintaining said desired cross-section of the structural member by moving said layers between opposed endless belts moving on each side of said layers above said endless conveyor belt and extending away from said fixed shaping surfaces in the direction of movement of said horizontal conveyor belt;
   (d) passing pre-tensioned reinforcing cords longitudinally above the conveyor belt and between said endless belts so that they become embedded between the cloth layers during steps (a), (b) and (c) aforesaid; and
   (e) subjecting the moving structural member with the reinforcing cords to heat so that the plastic resin is cured and the reinforcing cords are bonded within the cloth layers of the structural member.

2. The method as defined in claim 1 together with the additional step of providing a protective sheet under the multiple cloth layers in step (a) so that the cloth layers do not stick to the conveyor belt and shaping planes, and subsequently removing the protective sheet from the structural member when the resin has cured in step (d).

References Cited
UNITED STATES PATENTS

| | | | |
|---|---|---|---|
| 3,108,028 | 10/1963 | Sprunck et al. | 156—178 |
| 2,858,875 | 11/1958 | Lyman | 156—494 |
| 3,000,429 | 9/1961 | Warnken | 156—161 |
| 2,927,623 | 3/1960 | Huisman et al. | 156—179 |
| 2,969,301 | 1/1961 | Finger | 264—112 |
| 3,425,884 | 2/1969 | Brinkema | 156—161 |
| 3,438,843 | 4/1969 | Pagel | 156—179 |
| 3,506,526 | 4/1970 | Toyooka | 161—93 |

GEORGE F. LESMES, Primary Examiner

J. J. BELL, Assistant Examiner

U.S. Cl. X.R.

156—178, 494; 161—93, 143, 156